Oct. 25, 1966 D. F. MELTON ETAL 3,280,991
POSITION CONTROL MANIPULATOR
Filed April 28, 1964 6 Sheets-Sheet 2
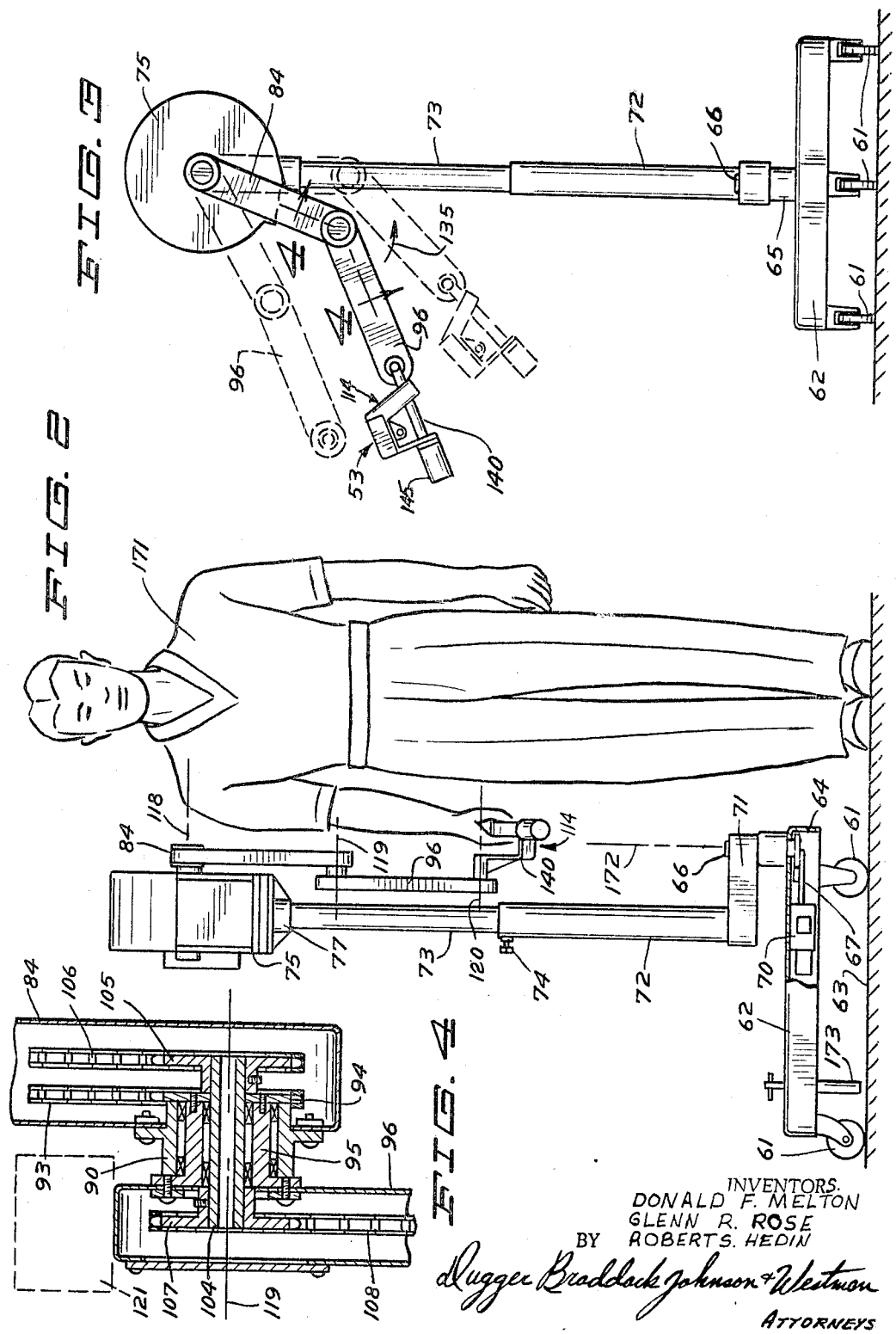
INVENTORS.
DONALD F. MELTON
GLENN R. ROSE
BY ROBERT S. HEDIN
Dugger Braddock Johnson & Westman
ATTORNEYS

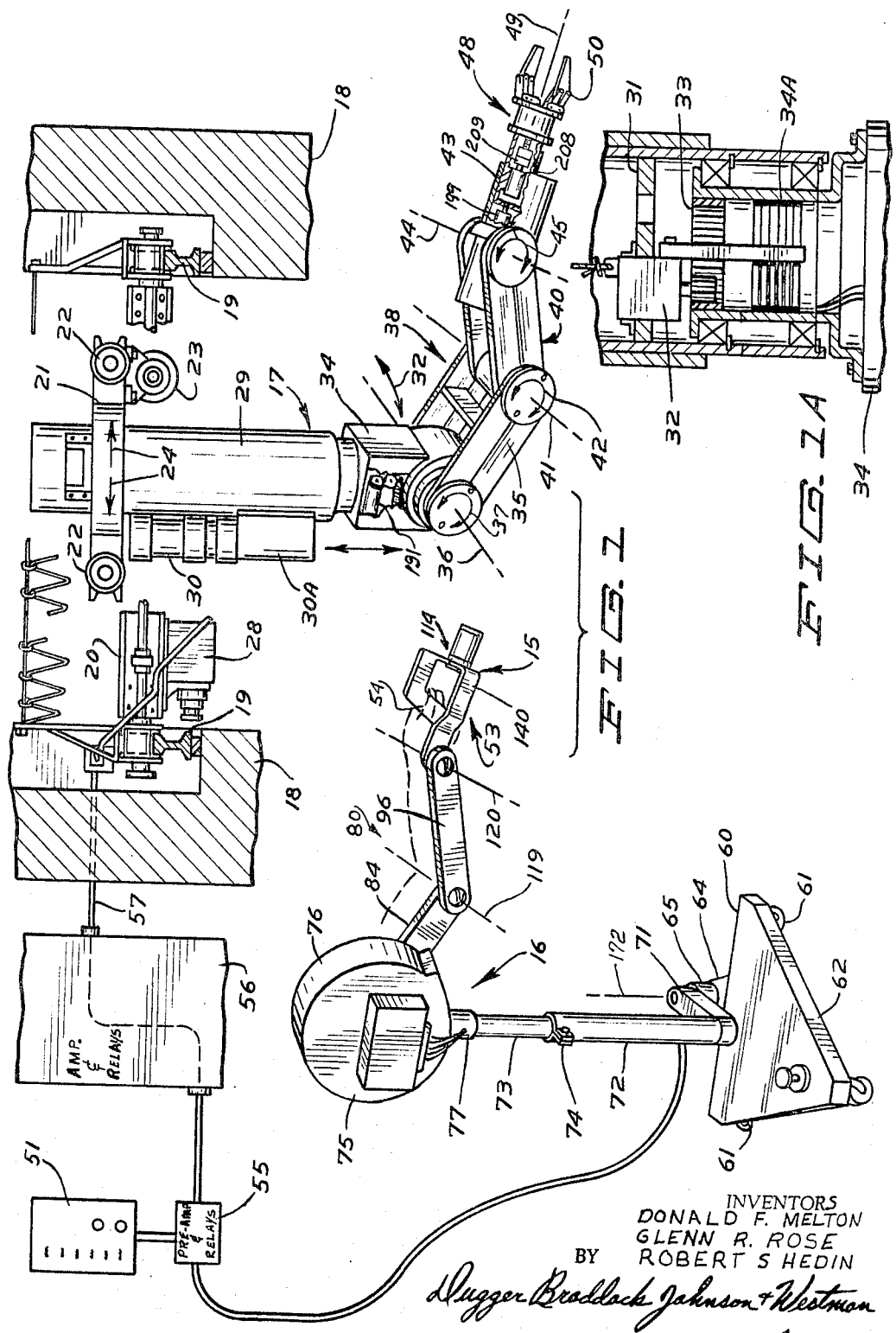

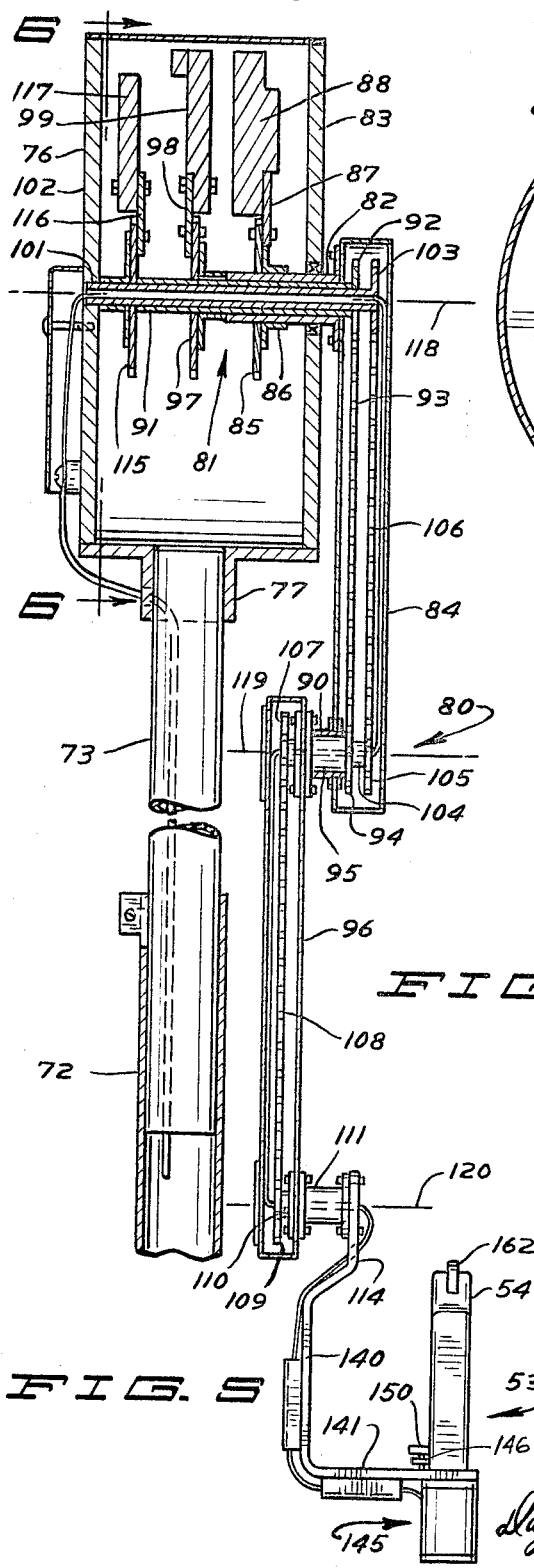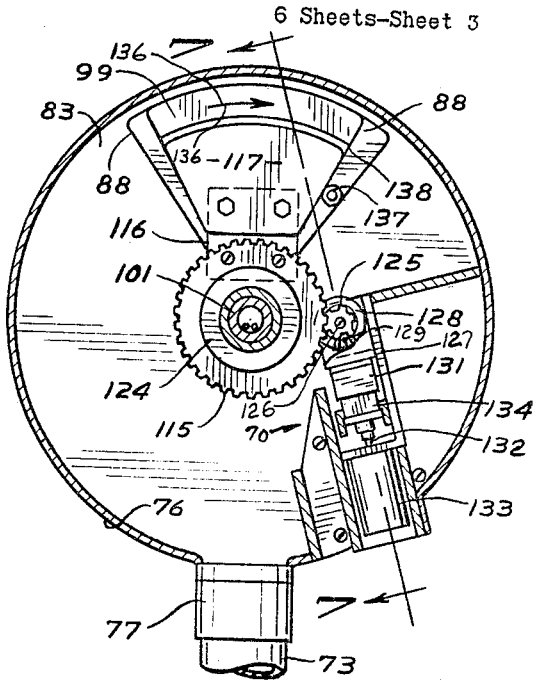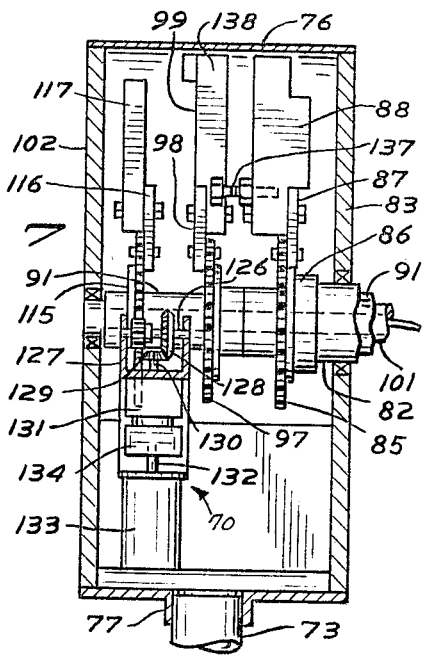

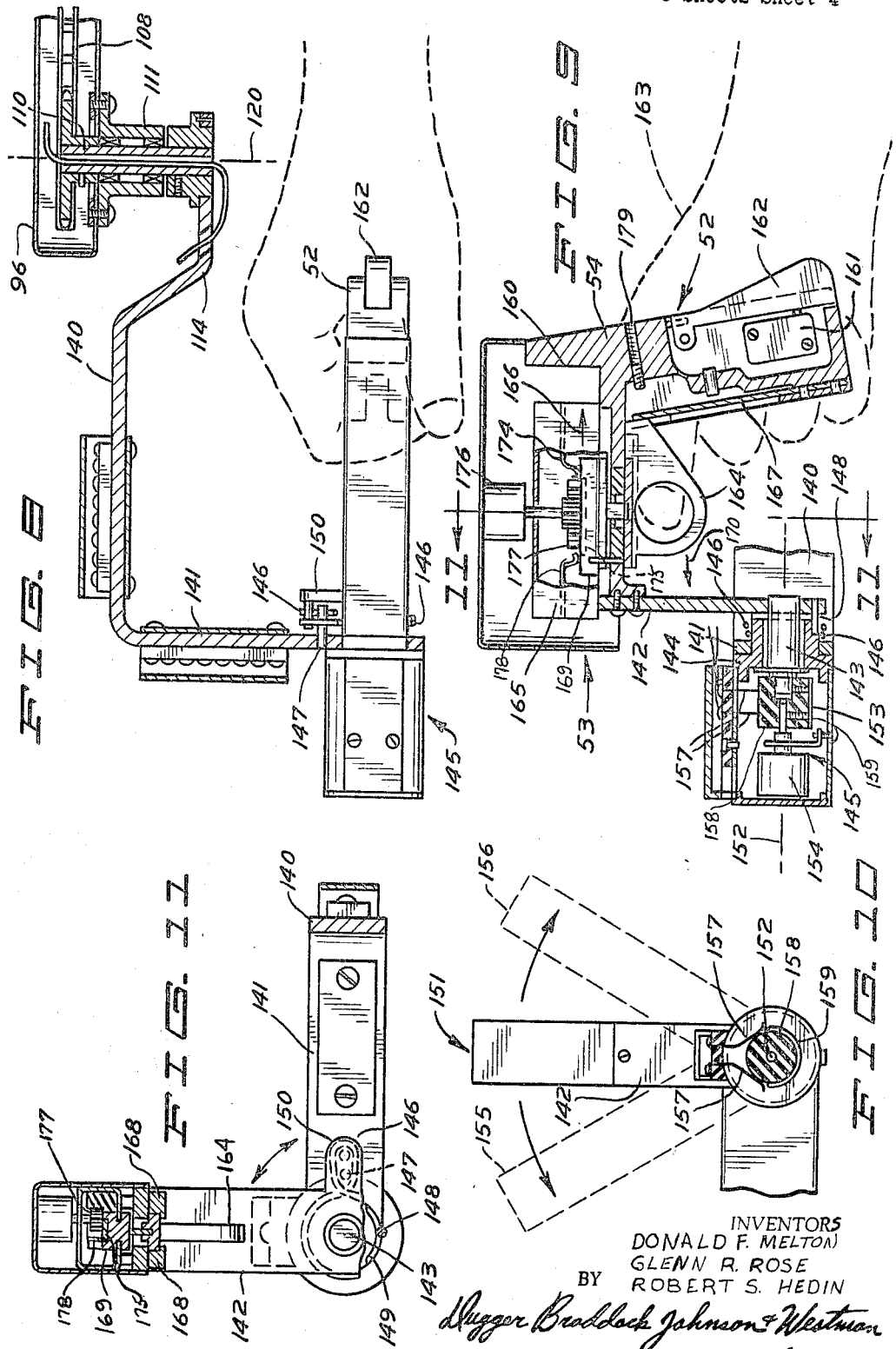

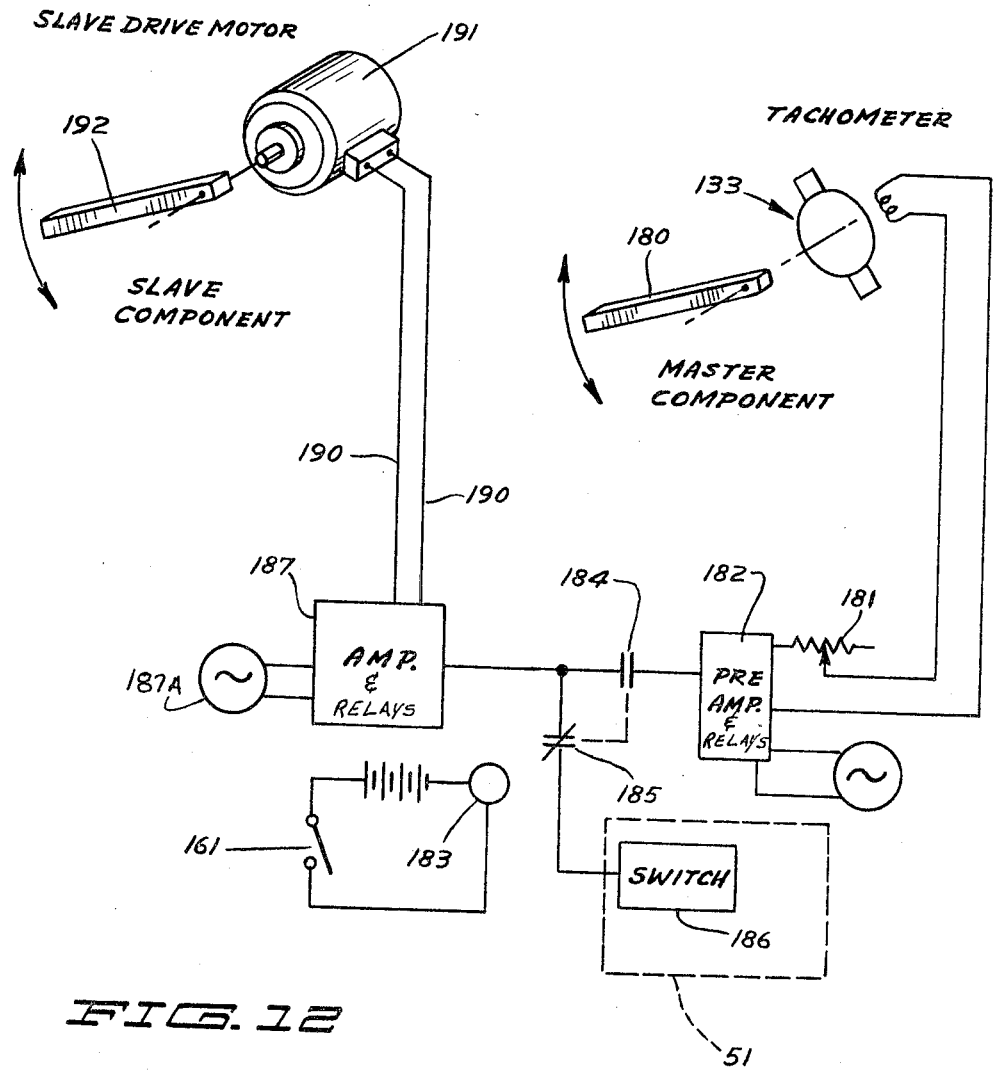

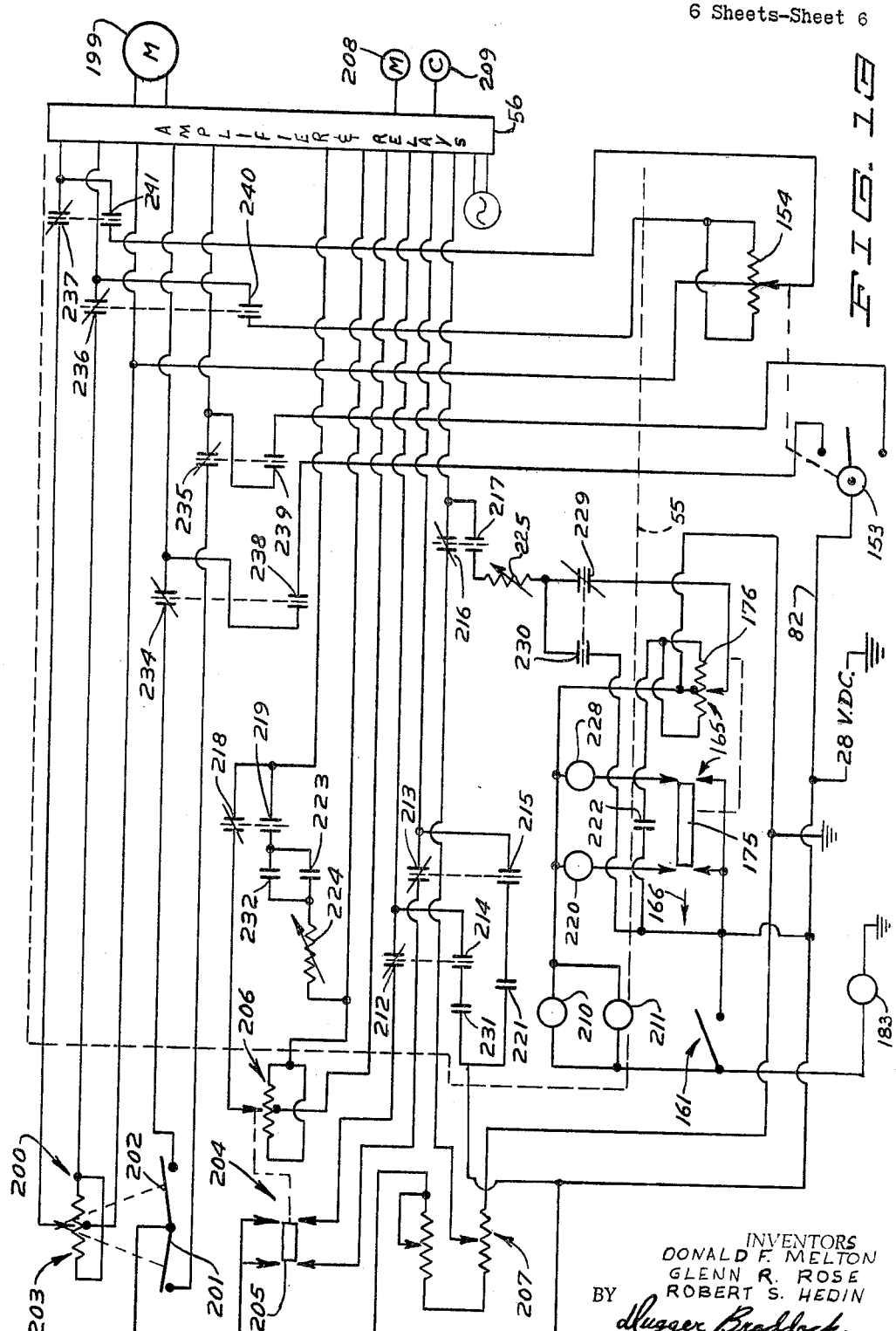

United States Patent Office 3,280,991
Patented Oct. 25, 1966

3,280,991
POSITION CONTROL MANIPULATOR
Donald F. Melton, Minneapolis, Glenn R. Rose, St. Paul, and Robert S. Hedin, Minneapolis, Minn., assignors to Programmed & Remote Systems Corporation, St. Paul, Minn., a corporation of Minnesota
Filed Apr. 28, 1964, Ser. No. 363,076
21 Claims. (Cl. 214—1)

The present invention has relation to a remote control manipulator in which motions of a control unit moved by an operator are reproduced by a manipulator unit through electrical signals from the control unit. More particularly, the invention relates to the method of obtaining the corresponding motions between the control unit and the manipulator, and to the mechanical construction of the control unit.

In previous remotely controlled electrically powered manipulators, two basic types of controls have been used. In one type, the velocity of each manipulator element is determined by the position of a switch or other electrical operator connected to the motor driving the manipulator element. The position of each manipulator element is determined by the velocity established and the time of operation. Although this type of control has advantages in preciseness of control and in maintaining position of each manipulator element when the person operating the device removes his hands from the controller, it requires that the person mentally integrate the velocity and time for each element to achieve a desired position or to follow a desired path. This results in a slow operation. In the other type, the relative positions of each corresponding control and manipulator element are compared by feedback means, an error signal generated if the corresponding elements are not in alignment, and the error signal used to drive the manipulator element in the direction to reduce the error signal. Thus, the position of the control element and the corresponding manipulator element are maintained. Although this type of a control provides good operational speed, such systems are expensive and complex, and do not afford the means of allowing the velocity control type of operation described above, to be used when slow precise motion of each separate manipulator element is desired.

In the device of the present invention as shown, the manipulator arm motions can be controlled either by a velocity control, whereby each manipulator element is driven by a separate control operator, or from a separate controller where the manipulator elements follow the motions of the control units, merely by activating or releasing one switch. The invention accomplishes the motion and position correspondence between the manipulator and control elements in a way different than those used previously, resulting in a simple and relatively inexpensive system.

There are many configurations of manipulators and controllers which can be used with this invention. In one embodiment of the invention, the master controls rotation of the slave about an upright axis, which corresponds to movement about a vertical axis at the shoulder of the operator and also controls movement of the slave about a transverse shoulder pivot, an elbow pivot and controls the wrist motions of the slave manipulator. The individual motions of the master unit each operating a tachometer-generator which generates an electrical signal which, when properly amplified will activate a motor on the slave to move the corresponding element on the slave.

The master unit is utilized with a "parallel arm" slave manipulator. A unique system of counterweighing the various master arm elements is presented, which minimizes the counterweight necessary and in turn reduces cost and simplifies operation.

The master unit is designed so that it can be used for arm motions while a controller having manually operated switches is used for other motions. An on-off master switch acting through suitable relays can be used to activate controls on the master manipulator and disable the corresponding switches on the normal controller.

It is an object of the present invention to present a new type of position control manipulator which permits natural arm movement of an operator for generating electrical signals utilized to obtain corresponding movements in a slave manipulator.

It is a further object of the present invention to present a unique method of counterweighting such a manipulator.

It is still a further object of the present invention to present a master position control manipulator which can be readily used interchangeably with switches or other electrical operation controls.

Other objects will be apparent as the description proceeds.

In the drawings,

FIG. 1 is a perspective view of a master position controller and slave manipulator made according to the present invention;

FIG. 1A is a fragmentary sectional view of the lower portion of a telescoping tube assembly used with the slave manipulator of FIG. 1;

FIG. 2 is a front elevational view of a master position controller made according to the present invention showing an operator in position to move the master controller;

FIG. 3 is a side elevational view of the device of FIG. 2;

FIG. 4 is a fragmentary enlarged sectional view taken as on line 4—4 in FIG. 3;

FIG. 5 is a vertical sectional view of the arm and upper support column of a position controller made according to the present invention;

FIG. 6 is a fragmentary sectional view taken as on line 6—6 in FIG. 5;

FIG. 7 is a sectional view taken as on line 7—7 in FIG. 6;

FIG. 8 is enlarged sectional view of a pistol grip type hand control of a master manipulator made according to the present invention;

FIG. 9 is a side elevational view of the device of FIG. 8 with parts in section and parts broken away;

FIG. 10 is a front elevational view of the device of FIG. 9;

FIG. 11 is a sectional view taken as on line 11—11 in FIG. 9;

FIG. 12 is a schematic representation of a typical master-slave drive of the present invention; and FIG. 13 is a schematic representation of typical circuits used to disable normal controls of the manipulator and activate controls on the master controller.

Referring to the drawings and numerals of reference thereon, a master-slave manipulator assembly illustrated generally at 15 includes a master unit illustrated generally at 16 and a slave manipulator illustrated generally at 17. The slave manipulator is of the type described and claimed in the copending application of Karl E. Neumeier, Serial No. 244,694, filed December 14, 1962, now Patent 3,247,978, for Manipulator Hand, and the copending application of Donald F. Melton and Karl E. Neumeier, Serial No. 244, 694, filed December 14, 1962, now Patent 3,247,979, for Manipulator Control System. The operation and control of the slave manipulator is more fully explained in these two copending applications, which are both assigned to the assignee of this application.

General construction

Slave manipulator 17 is mounted within a room defined by walls 18, 18 and the controls are outside of the walls. A pair of rails 19, 19 are mounted to the walls 18, 18 and a movable support bridge 20 is mounted for movement along the rails 19, 19. The bridge moves in direction into and out of the plane of the drawing of FIG. 1.

A carriage assembly 21 is mounted on suitable rollers 22, 22 onto the bridge 20 and is movable under power by a reversible electric motor 23 in directions as indicated by double arrow 24.

Thus, the manipulator assembly 17 is movable in two directions by moving the bridge and carriage at right angles to each other. The bridge 20 is powered through a reversible drive motor 28.

A telescoping tube assembly 29 is mounted to the carriage 21. The tube assembly can be extended or retracted in direction along its longitudinal axis, or in other words, vertically, through the utilization of a motor 30 and a winch 30A. The winch operates a cable that is attached through a bracket 31 (see FIG. 1A) to the innermost of the telescoping tubes. A reversible electric motor 32 is mounted on bracket 31 and drives a shoulder assembly 34 through a suitable internal ring gear and pinion illustrated at 33. The shoulder assembly is rotatably mounted to the innermost of the telescoping tubes and will rotate continuously in either direction of rotation. Electrical power to the various motors in the shoulder assembly and the manipulator arm is carried through a slip ring and brush assembly 34a.

The shoulder assembly 34 mounts a manipulator arm assembly 38. The reversible motors used to drive the arm assembly are mounted in the shoulder assembly and drive the arm as explained in the aforementioned application, Serial No. 244,148. An upper arm member 35 is pivotally mounted to the shoulder assembly about a transverse axis illustrated at 36. The upper arm will move in either direction about axis 36, as indicated by arrow 37, when the motor controlling the upper arm is suitably energized.

A forearm member 40 is pivotally mounted to the upper arm member 35 about an axis 41. The forearm member 40 is controlled through a reversible motor mounted on the shoulder member 34 and driving through suitable drive mechanism. The forearm 40 can be pivoted about axis 41 in directions as indicated by double arrow 42.

A wrist assembly 43 is pivotally mounted about an axis 44 to the lower end of the forearm 40. Pivoting of the wrist is also effected by a reversible motor mounted on the shoulder portion 34 and acting through chain drive linkage. The wrist assembly is movable in direction as indicated by double arrow 45 about this axis.

A hand member 48 is mounted to the wrist member and is rotatable by a motor 199 mounted in the wrist assembly about the longitudinal axis 49 of the wrist member. In addition, a pair of gripping jaws 50 are mounted on the hand member and are controlled by a suitable motor 208 mounted within the wrist member and operated as explained in the said application, Serial No. 244,148. The motor for controlling the gripping jaws runs a screw actuator that operates the jaws. An electromagnetic clutch 209 of the type manufactured by the Warner Electric Company of Beloit, Wisconsin is used to drive from the output shaft of the grip motor to the screw actuator. The driving torque of this clutch can be varied with suitable controls.

The various motors which drive components of the slave manipulator assembly are controlled normally from a controll console 51 which is connected to a relay amplifier power center 56 through suitable wires 57 to the various motors. The console 51 is identical to that described in the said pending application, Serial No. 244,694 and controls the various functions of the slave manipulator in the same manner.

It has been found that in many applications the operation of a slave manipulator arm can be expedited by utilizing a master arm operated in turn by a human being. The motions which lend themselves to the natural motions of the human arm can be controlled simply with the master manipulator. Other motions, such as the movement of the bridge 20, carriage 21 and telescoping tube assembly 29 do not lend themselves well to direct operation of the human arm.

Master controller

The master controller is designed to control the movement of the slave manipulator about its vertical axis; about the upper arm pivotal axis 36; about the fore arm pivotal axis 41; about the wrist pivotal axis 44; and also to control operation of the hand assembly and gripping jaws, through a pistol grip controller.

The master unit 16 controls the movements of the manipulator which corresponds to the movements of the human arms.

In the grip and wrist control portion of the master manipulator the controls are modified inasmuch as the slave can rotate continuously and the human wrist cannot.

The master unit includes a master power switch 52 in the pistol grip controller portion 53 of the unit. (See FIG. 9.) Master switch 52 is actuated when a hand grasps the handle member 54 of the pistol grip portion and this operates relays in a relay-preamplifier power center illustrated schmatically at 55 to disable the controls on the control console 51 for the functions which are controlled by the master and activate the master unit. The control counsole 51 is still used to control the movement of the bridge and carriage, and for controlling the vertical movement of the tube assembly 29.

The master unit 16 is mounted on a carriage 60 which is mounted on wheels 61 and is movable across the floor to various locations.

The carriage 60 includes a base platform 62. One of the wheels 61 may be a caster wheel as shown, in order to facilitate movement.

The base platform 62 has an outwardly extending portion 64 on which an upright collar 65 is mounted. A shaft 66 is rotatably mounted about a substantially vertical axis on suitable bearing within collar 65. The axis of shaft 66 is substantially parallel to the axis of the manipulator tube assembly 29. A lower end portion of the shaft 66 extends through the base platform 62 and is drivably connected to a suitable gear train 67 which in turn drives a tachometer generator assembly 70. The tachometer generator assembly 70 is used for generating an electrical signal which in turn will energize motor 32 to rotate the shoulder portion 34 about its vertical axis on the slave manipulator. These units will be called tachometers. This will be more fully explained as the description proceeds. The upper portion of the shaft 66 is drivably mounted onto an arm 71 which extends at substantially right angles to the axis of shaft 66.

A tubular upright column 72 is mounted to the opposite end of arm 71 and extends upright with the axis thereof substantially parallel to the axis of shaft 66. A tube 73 is slidably mounted within column 72. The upper portion of the column 73 is split.

A pair of lugs are fixed to the split sections of the column and a screw 74 is slidably mounted through one lug and threaded to the other. The screw 74 can be tightened to compress the split sections of the column onto the tube to hold it fixed in relationship with the column. The tube can thus be raised or lowered to any desired position by loosening the screw 74 and re-tightening it after moving the tube.

A shoulder member assembly 75 is mounted to the upper portion of the tube 73 and is fixed in relation thereto. The shoulder member 75 comprises a housing 76 having a neck 77 that is attached to the upper portion of the tube 73. The housing 76, as perhaps best seen in FIGS. 5, 6 and 7, mounts suitable shafts and mechanism for holding the master arm assembly, which is illustrated generally at 80.

A concentric shaft assembly 81 is mounted in the housing 76 about a substantially transverse axis which extends at substantially right angles to the axes of shaft 66, column 72 and tube 73. The shaft assembly 81 includes an outer tubular shaft 82 which extends through a first side wall 83 of the housing and is rotatably mounted in suitable bearings mounted on wall 83. The outer end of tubular shaft 82 has an elongated box-like master upper arm member 84 mounted thereon, which corresponds to the upper arm member 35 of the slave manipulator. Arm member 84 and shaft 82 are drivably connected together at the upper end of the arm. A spur gear 85 is positioned within housing 76 and has a hub 86 drivably mounted onto the shaft 82. Gear 85 has a bracket 87 mounted thereon adjacent the outer peripheral portions thereof and to which a counterweight 88 is attached. The counterweight 88 is utilized to counterbalance the normal weight supported by the upper arm so that the upper arm portion will remain in any position to which it is pivoted during operation.

An intermediate shaft 91 of the shaft assembly 81 is rotatably mounted within and with respect to outer shaft 82 on suitable bearings (not shown). The outer ends of the intermediate shaft 91 extend beyond the outer shaft 82. The intermediate shaft 91 has a sprocket 92 drivably mounted on a first outer end thereof. The sprocket 92 is positioned within the box-like tubular upper arm 84. A chain 93 is mounted over sprocket 92 and extends downwardly to a second sprocket 94 at the lower end of upper arm 84. Sprocket 94 is drivably mounted onto a tubular shaft 95 which is rotatably mounted in a hub 90 that is fixedly attached to the lower or outer end of upper arm 84, and extends outwardly therefrom. The shaft 95 is rotatable about an axis substantially parallel to the axis of the concentric shaft assembly 81.

The shaft 95 extends outwardly from the upper arm 84 and in turn is drivably mounted through an integral flange to a tubular forearm member 96. The tubular forearm has a rectangular cross section similar to the upper arm 84. The forearm member 96 is movable about the axis of shaft 95.

The end of intermediate shaft 91 opposite sprocket 92 terminates within housing 76 and has a gear 97 drivably mounted thereon. Gear 97 has a bracket 98 bolted thereto. Bracket 98 in turn has a counterweight 99 attached thereto. Counterweight 99 is of size to counterbalance the normal weight of forearm 96 and its attached mechanism.

An inner shaft 101 of shaft assembly 81 is rotatably mounted at a first end thereof to a second side wall 102 of the housing 76 and extends transversely across the housing. The inner shaft 101 is also rotatably mounted with respect to and within the intermediate shaft 91 of shaft assembly 81 on suitable bearings (not shown). The second end of shaft 101 extends into the interior of the upper arm 84. A sprocket 103 is drivably mounted on the second end shaft 101 and is positioned within the upper arm member 84. A chain 106 is drivably mounted over sprocket 103 and extends parallel to chain 93. The chain 106 is also drivably mounted over a sprocket 105 which in turn is drivably mounted on a first end of a tubular shaft 104 positioned at the lower end of the upper arm 84. The shaft 104 is rotatably mounted within tubular shaft 95 and extends beyond the shaft 95. Sprockets 103 and 105 are the same size.

A second end of shaft 104 extends beyond shaft 95 and into the interior of the tubular forearm member 96. A sprocket 107 is drivably mounted on the second end of shaft 104, within forearm 96. A chain 108 is drivably mounted over sprocket 107 and extends to and is mounted over a sprocket 109, which is the same size as sprockets 103, 105, and 107 of forearm member 96. Sprocket 109 is drivably mounted onto a shaft 110 which in turn is rotatably mounted within a hub 111 that is attached to the outer end of forearm member 96. Shaft 110 is rotatably mounted about an axis substantially parallel to the axis of shaft 104. A hand or wrist member assembly 114 (corresponding to a human hand in position) is drivably mounted to a flange integral with the outer end of shaft 110.

In housing 76 a gear 115 is drivably mounted to inner shaft 101 adjacent the wall 102. A bracket 116 is attached to gear 115 and the bracket 116 in turn has a third counterweight 117 mounted thereon, which is used to counterbalance the normal weight of the wrist member 114 and the associated mechanism during operation of the manipulator.

As can be seen, each of the arm members will pivot about its respective axis. The upper arm 84 will pivot about its axis 118, which passes through the center of the concentric shaft assembly; forearm 96 will pivot about its axis 119, which is at the outer end of the upper arm; and the wrist assembly will pivot about its axis 120, which is at the outer end of the forearm. All of these axes are parallel and correspond in position to the pivotal axes of the human upper arm; forearm and wrist. The arm portions can be pivoted independently of one another.

It can be seen that when the upper arm 84 is pivoted about its axis it will drive shaft 82, which, in turn, will rotate gear 85. A change of the angular position of the upper arm 84 results in a change of angular position of its counterweight 88. Therefore, while the effective moment arm of the upper arm has changed, the effective moment arm of the counterweight also correspondingly changes. The forces will remain balanced and the upper arm will remain in any position in which it is placed. The same is true with the counterweights for the other arm members.

When the forearm, for example, is pivoted about its axis 119, it will drive shaft 95 which in turn drives sprocket 94; chain 93 and sprocket 92. This will rotate shaft 91 and gear 97 to in turn change the position of counterweight 98 about its axis so that it continues to counterbalance the forearm 96 and weight supported thereby. The effective moment arm of the forearm and its counterweight will always change in a predetermined ratio so that regardless of the angular position of the forearm it will be effectively counterweighted.

Likewise, when the wrist member assembly 14 is pivoted about its axis 120, shaft 110 will be driven which will operate through sprocket 109; chain 108; sprocket 107; shaft 104; sprocket 105; chain 106 and sprocket 103 to drive inner shaft 101. Gear 115 will be driven, which in turn will move counterweight 117 the same number of degrees of rotation as the wrist assembly and will continue to counterbalance the weight of the wrist assembly, including the pistol grip and other associated mechanism.

Therefore, it can be seen that the counterbalancing of the individual arm members is accomplished through the use of individual counterweights mounted in the housing 76 which change in position when the individual portion of the arm is moved. The "parallel motion" of the arm members permits this type of counterweighting.

The chain and sprocket drives for the forearm and wrist assemblies are oriented so that each of the arm members will remain parallel to any position in which they were originally placed when other arm members are moved. The arm portions remain oriented in space. When the upper arm, for example, is moved, the position of forearm 96 will not change with respect to a reference plane and therefore no change in the counterweighting for the forearm is necessary in order to keep the forearm perfectly counterbalanced. Similarly, when the forearm 96 is moved and upper arm 84 does not move, counterweight 99, which will be driven by the forearm 96, will change in position as the center of gravity of the forearm changes. While upper arm 84 does carry the weight of the forearm and wrist, the weight of the forearm and wrist always acts on the upper arm through axis 119. The effective radius of action of the weight of the forearm and wrist does not change. The same is true of the weight of the wrist assembly which is attached to the forearm. The counterweight 99 for the forearm must be large enough to counterbalance the weight of the wrist assembly. The action of the weight of the wrist on the forearm will always be through axis 120, regardless of the angular position of the wrist assembly. Thus the only time the position of the counterweight for the forearm has to be changed is when the forearm itself changes position with respect to a reference plane.

This results in a savings in weight. For example, if a counterweight was attached to the upper end of forearm 96 as shown at 121 in dotted lines in FIG. 4, in order to counterbalance the forearm and wrist assembly about axis 119, the weight of the counterweight would be supported at the outer end of upper arm 84. This would necessitate counterbalancing the weight of this counterweight 121 about axis 118 at the upper end of the upper arm. The counterbalancing of counterweights is avoided with the present invention.

Likewise if the wrist assembly was counterbalanced at the end of the forearm this weight would have to be counterbalanced at the forearm and upper arm pivots.

*Tachometer units*

The movement of each of the master arm members about its pivot is utilized to drive the corresponding portion of the slave manipulator. This is accomplished by generating an electrical signal which, when suitably amplified, will drive an electric motor in the slave manipulator to move the corresponding slave element a distance proportional to the distance that the master component has been moved, and in direction dependent upon the direction of movement of the master.

Referring to FIG. 6, a typical drive used for each of the tachometers is shown (only one is shown for the sake of clarity). As shown, gear 115, which is driven by movement of the wrist assembly 114 about its axis, is utilized to drive a tachometer assembly 70 (each of the gears 85, 97 and 115 drive a separate assembly 70). The gear 115 drivably engages a driven gear 125 which is mounted onto a shaft 126, which in turn is rotatably mounted on a housing 127. A drive bevel gear 128 is mounted onto shaft 126 and this gear in turn drives a pinion 129 which is mounted to a shaft 130. Shaft 130 drives an overdrive gear box 131 of usual or preferred design to rotate an armature shaft 132 of a tachometer 133. A fly wheel 134 of suitable size is mounted on shaft 132 of the tachometer unit to prevent "cogging" of the brushes of the generator as it rotates. The fly wheel must be of sufficient size to cause the armature to move smoothly at slow speeds. The tachometer 133 is a standard unit which generates a voltage proportional to the speed of rotation of the shaft for a time duration equal to the length of time that the armature shaft is rotated. The electrical output from the tachometer unit 133, for example the tachometer which is driven in response to movement of the wrist assembly about its axis 120, is passed through suitable amplifiers and is utilized to drive an electric motor that controls movement of the wrist assembly 43 on the slave manipulator. A typical electric motor is shown schematically on the slave assembly. The construction of the slave assembly and its driving motors is shown in greater detail in the application of Karl E. Neumeier, Serial No. 244,148 for Manipulator Hand.

*Typical master-slave drive*

Referring specifically to FIG. 12, and the schematic representation of a typical component of the master-slave manipulator unit, it can be seen that the tachometer 133 is rotatably driven, as previously explained, by one of the arm components, which is illustrated at 180. The tachometer generates an electrical output signal which is fed by suitable leads through an adjustable gain feed 181 to a preamplifier and direction relay control unit 182.

As shown schematically, when a master switch 161 is closed it will energize a coil 183 and this coil 183 will close a set of normally open contacts 184 and open a set of normally closed contacts 185. The normally closed contacts 185, when they are opened, disconnect the normal control switch 186 that may be normally used for controlling the slave motor on the manipulator. The motor on the manipulator would then be powered from the power source 187A. With contacts 184 closed the electrical signal coming from the preamplifier in unit 182 will be carried to a main amplifier and reversing relay power center 187, which is normally used in conjunction with the manipulator controls. The output of the main amplifier will be carried through suitable leads 190 to energize and drive a reversible slave motor 191 which is connected to drive an arm component illustrated schematically at 192.

It is to be understood that the component illustrated in FIG. 12 is typical of the component drives which will be utilized with a master arm controller. Each of the motions, namely the movement of the master upper arm; master forearm; master wrist assembly; and movement of the master arm unit about vertical axis 172, will have a circuit substantially identical to that shown in FIG. 12.

When the master switch 161 on the pistol grip controller is closed it will, through suitable relay coils and contacts, as shown typically at 183, 184 and 185 disable each of the normal switches 186 for each of the slave arm movements and will connect the output of the respective tachometers or servo-generators through the preamplifier unit 182, to the main amplifier unit 187 and then to its controlled motor. The movements of the bridge and carriage, as well as the vertical telescoping of the tubes will continue to be switch controlled in a usual manner.

The signal generated by the tachometer is proportional to the angle of movement of the master component and the time of such movement. The signal received by the corresponding slave motor must be sufficient to move the slave arm component a corresponding amount in terms of angle and in the same length of time. In other words, a 1:1 ratio of movement between the master component and the slave component is necessary.

This 1:1 ratio is achieved by proper selection of the gain at the preamplifier of unit 182. The gain is adjustable, as shown schematically and once properly adjusted, 1:1 movement will always result.

It should be noted that the overdrive gear ratio between master component and its controlled tachometer insures an even flow of power and causes a signal to be generated even with very little angular movement of the master component.

The polarity of the signal generated by the tachometers and appearing at the preamplifier will depend upon the direction of rotation of the tachometer. Relays sensitive to the direction of current flow are located in the preamplifier and suitable switches or contracts are closed in response to this polarity so that the output from the preamplifier is carried to the main amplifier through lines which are selected in accordance with the direction of rotation of master. The signal from the preamplifier will energize relays in power center 187 which will connect motor 191 to the output of the main amplifier so as to obtain proper direction of rotation of the slave.

The schematic showing of contacts for disabling the controls on console 51 and activating the tachometers, as shown in FIG. 12 is simplified. However, each line leading from switches on the console to its controlled motor can have contacts which open to disable the switch and each line necessary to activate the tachometer to motor drive can have contacts which close to make the necessary connection.

The switch 186 is a direction control switch and also variable speed control switch. Only one line leading from the switch is shown for clarity. The motors used in the manipulator are variable speed and reversible. The speed of the motors depends on the strength of the signal from the master tachometer. This of course depends on the speed of the master unit.

The amplification factor of the amplifier utilized in each of the tachometer drives is sufficient so that for a given number of degrees of rotation the master component about its pivotal axis the slave component will rotate the same number of degrees about is pivotal axis and at substantially the same speed.

The physical construction of the master controller insofar as the pivoting portions, the chain and sprocket drive through the concentric shafts, and the upper concentric shaft assembly is identical to that of the slave. The slave is constructed much more ruggedly and with heavier components (for example heavier chains and box section arms) but the parallel motion is the same. Further, the physical position of each of the tachometers corresponds to the position of its controlled drive motor in the slave manipulator. The motors in the slave manipulator which drive the upper arm, forearm and wrist assemblies are located in the shoulder portion 34 and drive their respective arm components through gears, concentric shafts and chains and sprockets.

The wrist rotation motor, grip control motor and electromagnetic grip force clutch of the slave manipulator are positioned on the wrist assembly of the slave.

The necessary electrical wires for the pistol grip controller are passed through the tubular shafts at the wrist, elbow pivot, and shoulder pivot. The wires are at the axis of rotation of the respective elements and excessive flexing of the wires is thereby avoided.

The "parallel motion" of the arm components of the master and slave refers to the ability of one portion of the arm to remain parallel to a plane in space when the other portions of the arm are moved. This is accomplished through the use of the chain and sprockets which move their controlled arm portion independently of the other arm portions. For example, if only the upper arm is rotated about its axis, sprockets 92 and 103 will remain stationary with respect to the housing 76. This means that as the upper arm rotates the forearm and wrist (which are controlled by sprockets 92 and 103), will be held from rotating relative to their original position and while the axis 119 will be displaced, the forearm and wrists will remain oriented in space parallel to their original position.

This type of arm movement is explained in greater detail in the patent to Youmans, Patent No. 2,861,699.

Inasmuch as the forearm of the master unit can pivot in either direction about its axis, even beyond a straight line, and the human elbow cannot bend in a reverse direction past a straight position, the master controller arm must be prevented from "breaking backwards" or, in other words, pivoting past straight position in direction opposite from normal arm movement. A stop member is provided to prevent this reverse pivoting.

The counterweights for the different arm members move relative to each other about a common axis. Therefore, in order to prevent relative movement between the arm members, stops can be provided to prevent relative movement between the counterweights and because of the mechanical connection from each counterweight to its associated arm member, the arm members will be stopped from relative movement.

The specific example shown is the pivoting of forearm 96 about 119. The forearm can be allowed to pivot in direction as indicated by arrow 135 (see FIG. 3) only until the forearm and upper arm are substantially straight. When the forearm pivots in direction as indicated by arrow 135 its counterweight 99 moves in direction as indicated by arrow 136 in FIG. 6. A stop lug or bolt 137 is fixed to counterweight 88 for the upper arm. The lug 137 is positioned so that when the forearm has pivoted to be straight with the upper arm an edge surface 138 of counterweight 99 contacts the stop lug 137 and further rotational movement of forearm 96 in that direction is prevented. Rotation of forearm 96 in opposite direction is permitted. The lug would then move away from surface 138.

*Master wrist assembly*

The wrist assembly (or hand) 114 is comprised as a main mounting bracket 140 which is drivably mounted to the shaft 110 and pivots about axis 120. Bracket 140 is off-set as shown and has a front leg 141 which extends substantially parallel to the axis 120. As perhaps best seen in FIGS. 8, 9, 10, and 11, the pistol grip assembly 53 is mounted onto an upright support 142 which in turn is drivably mounted to a shaft 143 that is rotatably mounted in a housing 144 which in turn is fixedly attached to and extends through the leg 141. A torsion centering spring 146 is mounted over the housing 144 and has end hooks. The end hooks are mounted over a pin 147 fixed to leg 141 and a pin 150 on upright bracket 142, respectively. The spring 146 is utilized to return the pistol grip assembly 53 to an upright position as shown at 151 in FIG. 10. The pistol grip assembly 53 will pivot about an axis 152 (the axis of shaft 143) which is at right angles to the pivotal axis 120 of the wrist assembly and will always be returned by spring 146 to its center position as shown.

A stop pin 148 is mounted at the lower end of bracket 142. The pin 148 is positioned to extend into a recess 149 defined in housing 144. When the pistol grip assembly is pivoted to its end position pin 148 will engage the proper end surface of the recess to prevent the pistol grip controller from being rotated too far in either direction.

The shaft 143 drives a switch-potentiometer assembly 145. The switch-potentiometer assembly includes a switch 153 which controls power to the drive motor for rotating the hand assembly of the manipulator.

The switch assembly 153 comprises four spring loaded wiper arms 157 which ride on a cylindrical block 158 of insulating material, which is drivably mounted directly onto a reduced end portion of shaft 143. The block 158 also carries a shorting plate 159 of conductive material which extends slightly more than 180° around the cylindrical block of insulation material. Whenever the bracket 142 is rotated toward position as shown at 155 in FIG. 10, the shorting plate will come into contact with and complete a circuit between one of the pairs of wiper arms 157. This will energize the wrist drive motor 199 (FIG. 13) to cause it to rotated in a first direction. When the pistol grip controller and bracket 142 is returned to its center position as shown at 151, the wiper arms 157 will be riding on insulation material and no circuit will be completed. If the pistol grip controller is rotated in the opposite direction toward position shown at 156 the circuit between the opposite pair of wiper arms 157 will be completed through plate 159 and the motor 199 for rotating the wrist member on the slave unit will be rotated in the opposite direction.

As the piston grip controller is rotated about its axis 152, the insulation block 158 will also drive the wiper of the rotary-potentiometer 154. This potentiometer is connected so as to control the speed of the wrist motor 199 (see FIG. 13).

If the pistol grip controller 53 is moved a short distance from its center position as shown at 151 the slave hand assembly 48 will rotate slowly. The speed of rotation of the hand will increase as the deflection from the off position of the pistol grip controller increases. Likewise, when the pistol grip controller is rotated in direction toward the position shown at 156, the hand member 48 will rotate in the opposite direction and at a speed proportional to the displacement of the pistol grip controller from its center position 151.

The upright bracket 142 mounts a handle member 160 of the pistol grip controller. The handle member as stated previously, has a main switch assembly 52 which includes a switch member 161 and an actuator 162. The switch 161 is an on-off switch and when the actuator 162 is depressed, as when it is gripped with a hand shown in dotted lines at 163, the master switch 161 is turned on. This will energize relay coils and operate contacts that disable the console switches and connect the tachometers of the master manipulator assembly to the corresponding slave motors.

A trigger 164 is slidably mounted on brackets 168 of the handle member and is positioned so that it may be controlled by the index finger of the hand gripping the handle 160. The trigger 164 operates a slide switch 165 of the type illustrated and described in application Serial No. 244,694. The slide switch includes a slide member 169 which has a shorting plate 175. When the slide member 169 is pulled in direction as indicated by arrow 166 a pair of contact wires 174, 174 will be electrically connected together by the shorting plate 175. This will close a circuit so that the gripping jaws 50 of the hand member move toward their closed position or in other words move together.

As the slide member moves it also operates a center tap rotary-potentiometer 176 through a rack and pinion gear 177. The potentiometer is connected to control the strength of the field of an electromagnetic clutch 209 (see FIG. 13). The clutch in turn controls the force with which the gripping jaws 50 of the slave can be closed. The drive for the jaws and the clutch is shown in the application of Karl E. Neumeier for Manipulator Hand, Serial No. 244,148.

The displacement of the trigger 164 from its off position increases the maximum force with which the gripping jaws can grip an object. The greater the displacement in direction as indicated by arrow 166, the more the force exerted by the gripping jaws.

Trigger member 164 is spring loaded through a suitable leaf spring 167 and will return to a neutral or off position when released. The rate of spring 167 is selected so that the operator "feels" the increased force necessary to deflect the spring more. This simulates the increased force of grip of the jaws 50, which results when the trigger is deflected more. The trigger 164 can be moved a short distance from its neutral or off position in direction as indicated by arrow 170. This will cause the shorting plate 175 to electrically connect a second set of contacts 178, which will close a circuit to energize the motor to cause the jaws to open at a constant speed.

An adjustable stop screw 179 can be used to set the maximum deflection of the trigger member. The pistol grip controller is designed to correspond as closely as possible to the natural movements of the hand which will result in corresponding movements in the slave manipulator.

*Typical relay controls*

Referring specifically to FIG. 13, a representative schematic drawing of the electrical circuitry utilized for disabling the usual switch control for the slave manipulator and activating the pistol grip control of the master manipulator is shown.

The usual switch controls for controlling the wrist rotation motor for example, and which are on the console 51, are shown generally at 200. The controls include a pair of switches 201 and 202, respectively. Each switch controls rotation of the controlled wrist rotate motor 199 in one direction. When the switch control is rotated in a first direction from its off position switch 201 will be closed and when the switch control is rotated in opposite direction switch 202 will be closed. A potentiometer 203 is connected in the motor circuit, and is operated by the same control as switches 201 and 202. Increased displacement of the switch control in either direction from its off position will result in increased speed of rotation of the motor 199.

The controls for operating the gripping jaws in the controller are shown generally at 204 and include a directional on-off switch 205, which is used to energize the motor to rotate the motor in either direction and thereby open or close the jaws, and a potentiometer (controlled simultaneously with the switch) 206 for controlling the speed of the grip motor 208. The switches operate through an amplifier and reversing relay in the power center 56.

In the slave manipulator utilized there is an electromagnetic clutch 209 mounted in the drive train to the gripping jaws. A potentiometer 207 is used to control the strength of the magnetic field of this clutch.

As stated previously, when the master switch 161 on the pistol grip controller is closed the normal switch controls for each of the movements to be controlled from the master arm will be disabled. The controls which are on the master unit will be activated.

The master on-off switch 161 (FIG. 13), when it is closed, will energize a desired number of relay coils, in addition to coil 183, for example coils 210 and 211, as shown, when two switches at the control console are to be replaced. Coil 210 when energized opens normally closed contacts 212 and 213 which open the control lines from the switches for the grip control motor and will close normally open contacts 214 and 215. In addition, the coil will open sets of normally closed contacts 216 and 218 and close sets of normally open contacts 217 and 219. This will disable the normal switch controls for the grip motor and also the controls for the magnetic clutch and will activate the controls on the pistol grip controller. The slide switch 165 is now usable to control the gripping jaws.

When the shorting plate 175 of the slide switch, as seen in the schematic drawing, FIG. 13, is moved in direction as indicated by arrow 166, it will complete a circuit to energize a relay coil 220. The relay coil 220 will close sets of normally open contacts 221 and 222 and 223.

The potentiometer 176 is now connected to power through contacts 222 and the output is connected through normally closed contacts 229 and adjustable resistor 225 and contacts 217 (which are closed) to control the grip force of the gripping jaws. The more the slide switch is pulled rearwardly, the greater the force of the jaws. The speed of movement of the jaws remains constant but can be independently adjusted at any desired level by adjusting the resistor 224.

When the shorting bar 175 is moved in opposite direction from its off position a relay coil 228 is energized. Coil 220 is not energized, thereby returning its controlled contacts to their normal positions. The relay coil 228 opens a set of normally closed contacts 229 and closes a set of normally open contacts 230. It also closes normally open contacts 231 and 232. The gripping jaw motor 208 is energized in reverse direction and the jaws are closed at a uniform rate. The potentiometer 176 is disabled and there are no adjustments of force or speed during closing of the jaws.

When the master switch 161 is closed a second relay coil 211 is also energized. The coil 211 will open normally closed contacts 234, 235, 236 and 237. It will close normally open contacts 238, 239, 240 and 241. The switch 153 which is illustrated schematically will be connected to the lines controlling the energization of the wrist motor 199. (This motor rotates the grip portion of the wrist.) The direction of rotation of the wrist is controlled with the switch 153 as well. The potentiometer 154 which is operated simultaneously with switch 153, is connected to the lines controlling speed of rotation of the motor 199. The controls operate as explained previously in the description of the pistol grip controller. Rotation of the pistol grip from its center "off" position will energize motor 199 (which rotates the hand or grip on the slave) and the amount of displacement of the pistol grip controller controls the speed of rotation. The switch and potentiometer are connected through the power center 56.

All relays for disabling the console controls and connecting the master controls to the slave are placed in switching control box 55.

Also shown in FIG. 13 is the typical relay coil 183 which is used to disable the switch controls for the slave manipulator motor and activate the master controller. These are energized when master switch 161 is closed.

*Operation*

In operation, an operator illustrated at 171 will grasp the master arm assembly as shown with his hand on the handle portion of the pistol grip. In this position his wrist axis will substantially align with axis 120 of the wrist assembly; his elbow axis will substantially align with axis 119 about which the forearm pivots and his shoulder axis will substantially align with the axis 118 about which the concentric shafts 81 and the upper arm 84 pivot. In addition to this, the offset leg 71 will position axis 172 of shaft 66, substantially aligned with and over the vertical rotational axis of the shoulder joint as the operator 171 swings his arm.

Before the unit is used the base member 62 of the carriage 60 can be anchored by adjusting a stop stud 173 so that it contacts the floor 63 and holds the carriage 60 immobile during operation by the operator.

The operator will grasp the handle grip, thereby closing master switch 161 and activating the controls on the master controller through the provided relays.

By moving the arm in a natural manner the proper tachometers will be driven and corresponding movements of the slave manipulator will result. Inasmuch as the movement of the manipulator arm and the human arm correspond closely, the operation of the slave manipulator is much more simple with this type of position controller. Further, the carriage 60 can be moved from place to place if desired. If the master arm and the slave arm become out of place or position, the master switch can be turned off, which disables all of the controls on the master arm, and the master arm returned to a position corresponding to the position of the slave arm before again actuating the master arm.

In previous controls, where a positional-type controller is utilized, for example as shown in the patent to Goertz, Patent No. 2,846,084, it was necessary for operation that the master-slave components were exactly in the same position. If the units were turned off and the master arm had been moved from its last position, the slave arm would not move. If the unit was accidently turned on with the arms of the master and slave not corresponding in position, the slave arm would be violently whipped to a position corresponding to that of the master arm, because of the electronic controls thereof. This will not happen with the open loop velocity drive as shown in FIG. 12. If the arm members controlled get slightly out of phase when the unit is turned off, there will be no violent whipping of the master manipulator when the unit is turned back on again.

Other advantages of this type of drive are of interest. For example, if the slave manipulator is to perform work overhead, this can become very tiring to the operator. However, by positioning the slave arm in the master arm out of phase, for example approximately 90 degrees, the slave arm can work overhead and the master arm can actually be manipulated from a horizontal or lower position. This also aids in eliminating operator fatigue.

The controls for the slave hand member, including the wrist control, are operated with the pistol grip controller and do not drive tachometers. These controls, as explained previously, operate through switches and potentiometers. The grip control for the slave is controlled by the forefinger actuating the trigger slide. The displacement of the slide from its off or neutral position determines the amount of force that the gripping jaws on the slave manipulator can exert. Likewise, twisting the pistol grip controller about its axis 152 will activate the motor for driving the slave hand member about its longitudinal axis or in other words for rotating the hand member. Increased displacement from the center off position of the pistol grip controller will result in increased speed of rotation of the hand member.

What is claimed is:

1. In a positioning controller for a slave manipulator assembly having a plurality of rotationally driven components and electric motors for driving slave components, said positioning controller including a master unit having elements corresponding in position and relationship to the components of the slave, the improvement comprising a tachometer mounted to be rotationally driven whenever a master element is moved, and to generate an electrical signal, electrical connection and amplifying means connecting each of said tachometers to power an electric motor on said slave, said electric motor being adapted to move a slave component corresponding to the master element driving the tachometer when receiving a signal from the tachometer, said electrical connection and amplifying means being adjustable in output so as to obtain substantially one to one relationship in rotational movement between the master element and the slave component.

2. A master manipulator controller having master members pivotally mounted together and corresponding to the human upper arm, forearm, and wrist member, each of said members being pivotally mounted to the next adjacent member about mutually parallel axes, a slave manipulator having slave members corresponding to the members of the master controller, separate motor means for driving each of the slave members, electrical signal generating means driven by each of the members of the master controller and connected to a drive motor which drives a corresponding member on the slave, said master manipulator controller being mounted on a movable carriage, the master member corresponding to the human upper arm being pivotally mounted to a housing about a substantially horizontal axis, said housing being rotatably mounted to said carriage about a substantially vertical axis, and said housing being offset from its pivotal axis a distance sufficient so that when an operator positions his arm adjacent the master controller arm the vertical axis of shoulder rotation of the operator will be substantially aligned with the vertical pivotal axis of said housing.

3. The combination as specified in claim 2 wherein said slave manipulator is rotatably mounted about a substantially vertical axis, second motor means to rotate the slave manipulator about its vertical axis, second electrical signal generating means driven in response to movement of the master unit about its vertical axis and electrical connection and amplifying means connecting the output of the second electrical signal generating means to the second motor means.

4. A manipulator controller comprising a plurality of arm elements pivoted together in position to correspond to a human upper arm, forearm, and hand, said master controller having a support member, a plurality of concentric shafts independently rotatably mounted on said support member, each of said shafts being mechanically connected so as to pivot with a separate one of the arm elements, each of the arm elements remaining parallel to its original position when the other elements are independently rotated, the axes of said shafts being the upper axis of pivot of the upper arm element, separate counterweight means mounted to rotate with each of said concentric shafts and being of size and position to counter balance the weight supported by the arm element to which the shaft is mechanically connected, and cooperative stop means between the counterweights for the master forearm and upperarm to limit the movement of these arm elements in one direction past a substantially straight line position.

5. A manipulator control system including a slave manipulator having at least one arm element, electrical motor means drivably connected to the slave arm element, a master manipulator having an arm element corresponding to the slave arm element, electrical means driven by the master arm element for generating an electrical signal, an independent source of electrical power, first electrical switch control means for connecting the independent source of electrical power to the slave motor independently of said master element, and second electrical control means for disabling said first electrical control means and electrically connecting the electrical means driven by said master element to the motor for said slave element.

6. The combination as specified in claim 5 wherein said master element has a pistol grip member mounted thereon, said pistol grip member having a handle grip portion adapted to be grasped by an operator, said second electrical control means being actuated whenever the handle grip portion is grasped by the operator.

7. The combination as specified in claim 6 wherein said slave manipulator has gripping jaws, and motor means for rotating said gripping jaws and wherein said pistol grip member is movable about an axis extending at substantially right angles to the axis of pivot of said master element, said pistol grip member being movable about its axis from a center off position in either direction of rotation, switch means actuated by pivoting of said pistol grip member from its center off position, said switch means being connected to control the motor means for rotating the gripping jaws on a slave manipulator.

8. The combination as specified in claim 7 wherein said slave manipulator has motor means thereon for opening and closing said gripping jaws, and a slide member positioned ahead of the handle grip portion of said pistol grip member, said slide member being engageable by the fore finger of an operator having his hand on the handle grip portion, switch means controlled by said slide member and adapted to control the motor on said slave which opens and closes the gripping jaws on said slave, and variable force clutch means on the slave for limiting the force exerted by said motor means on said gripping jaws, potentiometer means electrically connected to the variable force clutch, means to control the maximum force which can be carried by the clutch, said potentiometer means being controlled by said slide member so that the force which can be carried by said clutch increases as said slide member is moved toward said handle grip portion.

9. The combination as specified in claim 7 and bias means urging said pistol grip member toward its center off position.

10. The combination as specified in claim 9 and electrical control means operated by pivoting of said pistol grip member from its center off position and adapted to cause an increase in speed of the motor means for rotating the gripping jaws with an increase in deflection of the pistol grip controller from its center off position.

11. The combination as specified in claim 10 and stop means to limit pivoting of said pistol grip controller in either direction of rotation.

12. The combination with a slave manipulator having a support member, an upper arm member pivotally mounted to said support member, a forearm member pivotally mounted to said upper arm member at an outer end thereof, and a wrist assembly pivotally mounted to an outer end of said forearm, a separate drive motors for driving each of said arm members and said wrist assembly about their respective pivotal axes, a grip member on said wrist assembly, a wrist rotate motor on said wrist assembly for rotating said grip member with respect to said wrist assembly, a grip control motor, drive means connecting said grip control motor to said grip for opening and closing it, and separate normal switch means located remotely from said manipulator for controlling the operation of each of the motors on said slave manipulator, of: a master position controller having an upper arm, forearm and wrist assembly pivotally mounted to each other and corresponding to the arm members of the slave manipulator, separate electrical signal generating means associated with each of said controller arm members and said wrist assembly and adapted to generate a signal when any of said master arm members pivots about its respective axis, said wrist assembly including a pistol grip member on said wrist assembly of the master controller, said pistol grip member having first switch means thereon for operating the motor controlling rotation of the wrist and second switch for controlling the motor for opening and closing of said grip member on said slave manipulator, electrical connection means for connecting said electrical signal generating means for each of the movements of said master manipulator and the switch means on said pistol grip controller to the corresponding controlled motors on the slave manipulator means, and a master switch on the pistol grip member, said electrical connection means including relay means energized when said master switch on said master manipulator is closed, said relay means including first separate normally closed contacts which open to disable each of the normal switch control means for said slave manipulator when the relay means is energized and second normally open contacts which close to connect the signal generating means and the first and second switch means on said master controller to their corresponding motors on said slave manipulator when the relay means is energized.

13. The combination as specified in claim 12 wherein said master switch is located on a handle portion of said pistol grip member and is closed whenever a hand grips the handle portion of the pistol grip member.

14. The combination as specified in claim 13 wherein the pistol grip member is pivotally mounted for movement about an axis substantially perpendicular to the pivotal axis of said wrist assembly, said switch means for activating said wrist rotate motor being connected so as to be energized whenever said pistol grip member is moved from a center off position about said axis, and potentiometer means driven by rotation of the pistol grip member and electrically connected so as to increase the speed of rotation of the wrist rotate motor in proportion to the amount that the pistol grip member is moved in either direction from its center off position.

15. The combination as specified in claim 14 wherein a slide switch for controlling the grip motor is mounted on said pistol grip member, and a trigger member for controlling said slide switch, movement of said trigger member toward said handle grip closing said slide switch for energizing the slave grip motor to cause the slave grip member to close.

16. The combination as specified in claim 15 wherein said drive from the slave grip motor to the slave grip includes a variable force electro-magnetic clutch, and potentiometer means connected so as to control the field of said clutch, increased displacement of said trigger member toward said handle grip increasing the force with which the slave grip member closes.

17. The combination as specified in claim 16 and leaf spring means resiliently resisting movement of said trigger member toward said handle grip.

18. The combination as specified in claim 17 wherein the slave manipulator arm members are mounted to housing, said housing being rotatably mounted about a substantially vertical axis, motor means for driving the housing about its vertical axis, and wherein said master controller member is mounted to a housing, a movable base for mounting the housing, said housing being pivoted for movement on said base about a substantially vertical axis offset from the housing so that when an operator grasps the pistol grip member the vertical axis of shoulder rotation of the operator is substantially aligned with rotational axis of said housing, and separate electrical signal generating means actuated by movement of the master housing about its vertical axis and means electrically connecting the last mentioned signal generating means to the motor means for driving the slave manipulator housing about its vertical axis.

19. A master manipulator controller comprising a mobile carriage, a housing supported by said carriage, said housing being movable about an upright axis offset from said housing, a master manipulator upper arm mounted to said housing about a substantially horizontal axis corresponding in position to the horizontal pivotal axis of a human upper arm, a master manipulator forearm pivotally mounted to an outer end of said master upper arm about a substantially horizontal axis, and a master controller wrist assembly pivotally mounted to an outer end of said forearm, the pivotal mounting of said forearm and said wrist assembly corresponding to the pivotal position of an elbow and wrist of a human arm, a plurality of concentric shafts rotatably mounted with respect to each other and with respect to said housing, a first of said shafts being drivably attached to said upper arm, a second of said shafts extending through said first shaft and a third of said concentric shafts extending through said first and second shafts, fourth and fifth concentric shafts independently rotatably mounted with respect to the outer end of said upper arm, said fourth shaft being drivably connected into said forearm member, mechanical drive means extending between the outer end of said second shaft and the outer end of said fourth shaft to cause said second and fourth shafts to rotate simultaneously, second mechanical drive means connected between the outer ends of said third shaft and said fifth shaft to cause said third and fifth shafts to rotate simultaneously, and a sixth shaft rotatably mounted to an outer end of said forearm, said sixth shaft being drivably attached to said wrist assembly, and third mechanical drive means extending between said fifth shaft and said sixth shaft so that said third, fifth and sixth shafts rotate simultaneously, and first, second and third counterweight means drivably attached to said first, second and third shafts respectively, the first counterweight means being of sufficient weight and positioned to counter balance the weight of said wrist, forearm and upper arm, said second counterweight means being of sufficient weight and positioned to counter balance the weight of said wrist and said forearm; and said third counterweight means being of sufficient weight and positioned to counter balance the weight of said wrist assembly, said counterweights being mounted so as to rotate with the shaft to which they are attached.

20. The combination as specified in claim 19 and a stop lug mounted on the first counterweight and adapted to engage said second counterweight to prevent relative movement of said first and second counterweight in one direction past a predetermined position wherein said forearm and upper arm form a substantially straight line.

21. In a position controller for a remote manipulator assembly having at least one rotationally driven component and an electric motor for driving the remote component, said position controller including a master unit having an element corresponding in position and relationship to the component of the remote manipulator, the improvement comprising a tachometer mounted to be rotationally driven whenever the master element is moved and thereby to generate an electrical signal, electrical connection and amplifying means connecting said tachometer to power the electric motor on said remote manipulator, said electric motor being adapted to move the slave component when receiving a signal from the tachometer, said electrical connection and amplifying means being adjustable in output so as to obtain substantially one to one relationship in angular movement between the master element and the remote component.

References Cited by the Examiner
UNITED STATES PATENTS

| | | | |
|---|---|---|---|
| 2,858,947 | 11/1958 | Chapman | 214—1 |
| 2,861,699 | 11/1958 | Youmens | 214—1 |
| 3,093,784 | 6/1963 | Mintzer | 318—327 |
| 3,128,887 | 4/1964 | Guennec et al. | 214—1 |

MARVIN A. CHAMPION, *Primary Examiner.*

HUGO O. SCHULZ, *Examiner.*

R. G. SHERIDAN, *Assistant Examiner.*

UNITED STATES PATENT OFFICE
CERTIFICATE OF CORRECTION

Patent No. 3,280,991                                October 25, 1966

Donald F. Melton et al.

It is hereby certified that error appears in the above numbered patent requiring correction and that the said Letters Patent should read as corrected below.

Column 2, line 64, for "244,694" read -- 244,148 --; same line 64, for "December 14" read -- December 12 --; column 3, line 72, for "controll" read -- control --; column 10, line 49, for "rotated" read -- rotate --; line 59, for "piston" read -- pistol --; column 13, lines 70 and 71, for "ocntrolled" read -- controlled --.

Signed and sealed this 5th day of September 1967.

(SEAL)
Attest:

ERNEST W. SWIDER                              EDWARD J. BRENNER
Attesting Officer                                    Commissioner of Patents